UNITED STATES PATENT OFFICE.

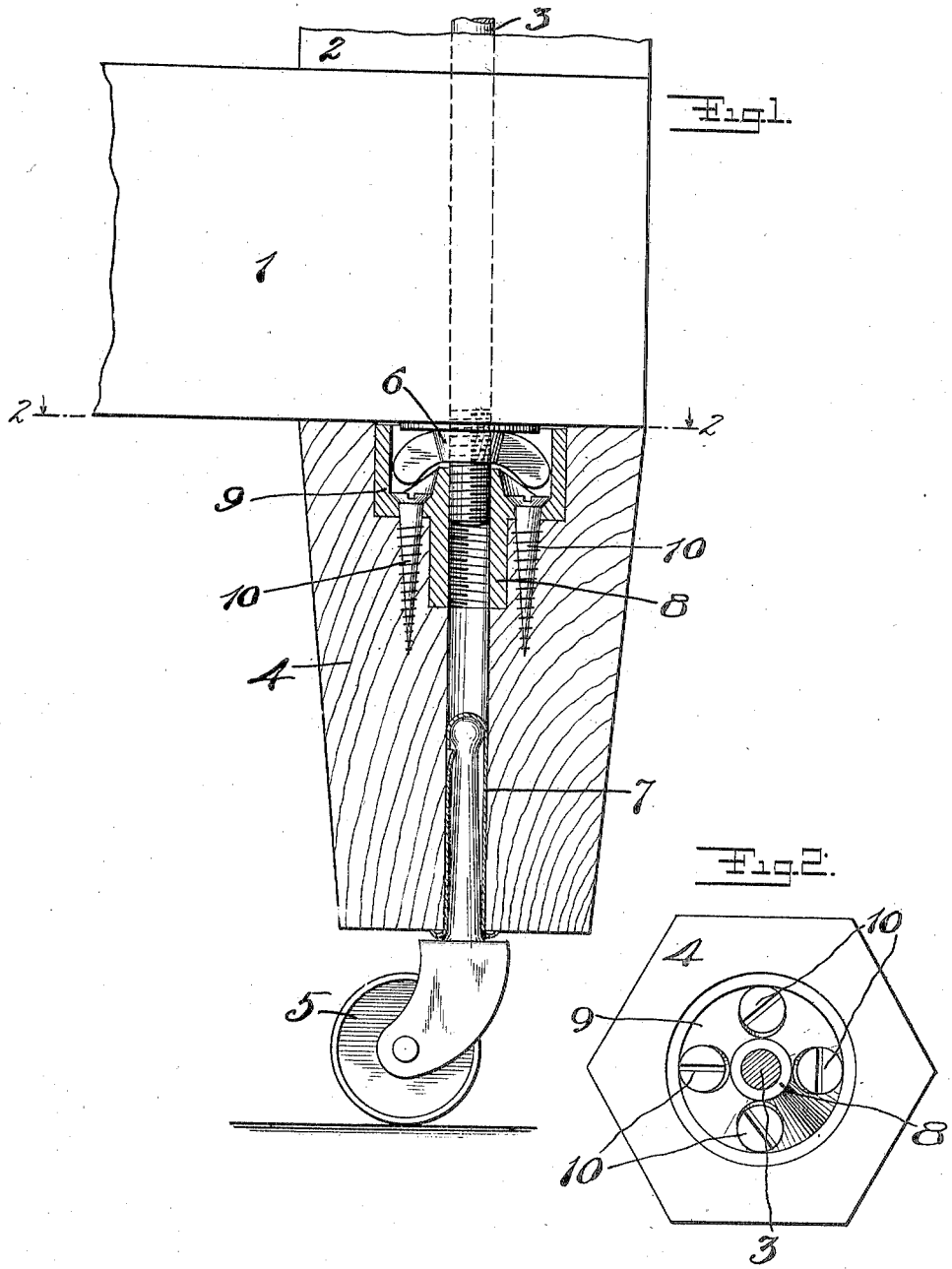

HERBERT J. GWYER, OF YONKERS, NEW YORK.

REFRIGERATOR CONSTRUCTION AND REMOVABLE LEG.

1,345,764.     Specification of Letters Patent.     Patented July 6, 1920.

Application filed January 16, 1920. Serial No. 351,914.

*To all whom it may concern:*

Be it known that I, HERBERT J. GWYER, a citizen of the United States of America, residing at Yonkers, New York, have invented a new and useful Refrigerator Construction and Removable Leg, of which the following is a specification.

My invention relates to new and improved means for detachably securing legs to cabinets such as refrigerators, the object being to provide an effective detachable connection, whereby when the refrigerators are packed for shipment, the legs may be detached to save space.

In the accompanying drawings:

Figure 1, is a side elevation partly in section showing my invention.

Fig. 2, is a plan view of the leg looking down on the line of 2—2 of Fig. 1.

1 represents the lower panel of the cabinet. 2 represents a side panel. These parts are held together by a bolt 3. 4 represents the main body of the leg of suitable design. 5 represents the usual caster. 6 represents a nut for the lower end of the bolt 3. The length of the bolt 3 is such that the lower end will project below the nut 6 so as to furnish a means for securing the leg 4 to the cabinet. The leg is provided with a counter-bored passage, which in its preferred form, extends entirely through, so as to provide an opening at the lower end for a caster socket 7, the hole for which would otherwise be separately formed. In the counter-bored upper end of the bore in the leg is positively secured a threaded sleeve 8 which is arranged to screw onto the exposed lower end of the bolt 3. This sleeve is provided with an offset flange or housing 9, through the bottom of which housing may pass wood screws 10—10, for the purpose of securing the sleeve rigidly in the leg. The housing forms a suitable cavity to provide clearance for the nut 6 when the parts are assembled.

In operation, it is merely necessary in order to apply the leg 4, to screw the same onto the lower end of the bolt 3 until the upper end of the leg is firmly seated against the lower side of the cabinet. The leg hides and protects the lower end of the bolt connection for the cabinet. If desired, the leg may be hexagonal in outline, which not only furnishes a graceful appearance, but permits a suitable tool to be applied to the leg in the act of screwing it tightly home. The particular shape however is not essential to this invention. The threaded sleeve is so proportioned that the upper end of the same will lie close to the nut 6 when the parts are assembled, so that it will tend to hold the nut against dislodgment. If, however, the nut 6 should become slightly loosened, the bolt 3 would still be securely held by the sleeve 8, which together with the leg when in place performs the added function of a holder for the bolt 3. It will also be understood that I contemplate making various changes and modifications without departing from the spirit and scope of the appended claims.

What I claim is:—

1. In a cabinet, a bolt carried by the cabinet and projecting from the lower part thereof, a nut screwed onto said bolt and leaving a portion of the threaded end exposed for engagement by the leg, a detachable leg comprising a body, a threaded sleeve rigidly secured in the upper end of said leg and threaded to screw on to said bolt, and a recess or chamber in the upper end of said leg to afford clearance space for the nut on said bolt, said sleeve coöperating with said nut to hold said bolt.

2. In a cabinet construction, a cabinet body, a holding bolt therefor with threaded end of said bolt being exposed at the underside of said body, a nut for said threaded end of the bolt, the latter projecting beyond said nut when the cabinet body is assembled and constituting a means for securing a leg to said cabinet body, a leg having a threaded sleeve rigidly mounted in the upper end thereof and arranged to be screwed on to the threaded end of said bolt and to coöperate with said nut in performing the bolt holding function.

3. In a cabinet construction, a cabinet body, a holding bolt therefor with threaded end of said bolt being exposed at the underside of said body, a nut for said threaded end of the bolt, the latter projecting beyond said nut when the cabinet body is assembled and constituting a means for securing a leg to said cabinet body, a leg having a threaded sleeve rigidly mounted in the upper end thereof and arranged to be screwed on to the threaded end of said bolt and to coöperate with said nut in performing the bolt holding function, an offset housing integral with said sleeve and forming a clearance recess for said nut.

4. A detachable leg for cabinet, comprising a body having a longitudinal counterbored passage therethrough for receiving a caster socket in the lower end thereof, a threaded sleeve secured in the upper end counterbored portion of said passage, said sleeve having an offset flange, said leg having an enlarged central cavity above said counterbored portion and above said flange of a size equal at least to the diameter of the flange and of a depth greater than said flange to afford clearance for a nut above said flange.

HERBERT J. GWYER.